No. 11,953. Reissued Dec. 3, 1901.

H. L. HOPKINS.

SHEARS.

(Application filed Oct. 12, 1901.)

Witnesses

Don D. Perry

J. B. Weir

Inventor

Harvey L. Hopkins, by Coburn, McRoberts & McCloy,

Attorneys.

UNITED STATES PATENT OFFICE.

HARVEY L. HOPKINS, OF CHICAGO, ILLINOIS, ASSIGNOR OF ONE-HALF TO LOUIE C. ROLLO, OF CHICAGO, ILLINOIS.

SHEARS.

SPECIFICATION forming part of Reissued Letters Patent No. 11,953, dated December 3, 1901.

Original No. 677,662, dated July 2, 1901. Application for reissue filed October 12, 1901. Serial No. 78,509.

*To all whom it may concern:*

Be it known that I, HARVEY L. HOPKINS, a citizen of the United States, residing at Chicago, county of Cook, and State of Illinois, have invented certain new and useful Improvements in Shears; and I do hereby declare the following to be a full, clear, and exact description of the invention, such as will enable others skilled in the art to which it appertains to make and use the same.

The invention relates to improvements in scissors or shears, and has for its object to provide a spring attachment exerting a lateral pressure on the blades toward each other, whereby the cutting edges may at all times be held in such close contact as to insure the desired shearing action. It has been the practice heretofore to secure the necessary contact of the blades by means of adjusting-nuts on the pivot or by making the pivot itself screw into one of the blades or by employing a spring for the pivot between the blades. So far as I am aware, however, it has not been proposed to employ a spring that is independent of the pivot and connected to the blades at points eccentric to the pivot, so as to keep the cutting edges of the blades in proper contact and preserve the necessary shear cut between them.

The present improvement, therefore, consists in using the ordinary form of pivot and employing in connection with it a spring that is entirely independent of the pivot and in connecting this spring to the blades of the shears at points eccentric to the pivotal point and preferably in front of the pivot, and I have found that this arrangement secures and preserves a better shearing contact between the cutting edges than if the spring were arranged to bear at the pivotal point.

The invention is illustrated in the accompanying drawings, wherein—

Figure 2:
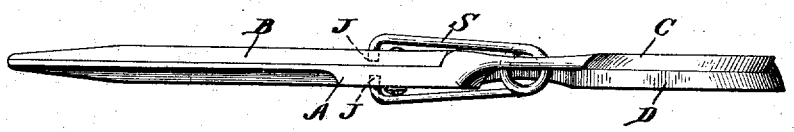
Figure 3:
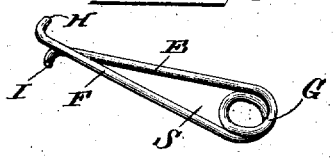

Figure is a side view of a pair of ordinary shears with my improvement attached. Fig. 2 is an edge view of the same, and Fig. 3 is a perspective of the spring detached.

Similar letters of reference in the views refer to the same parts.

Figure 1:
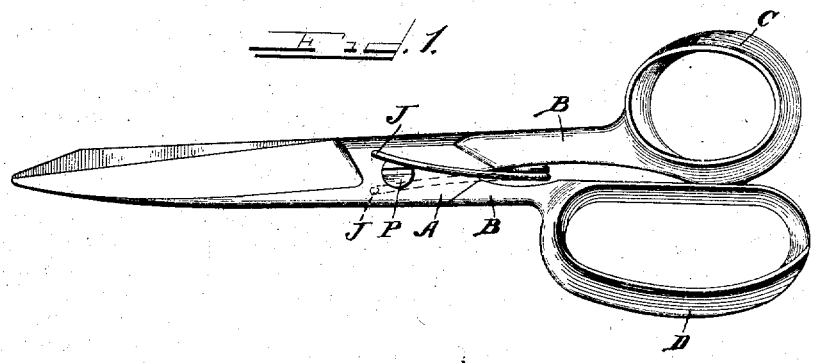

Referring to Figs. 1 and 2, A denotes a pair of ordinary shears, having handles C D of the usual construction. The handles are connected to the blades by the usual shanks B, and the blades are connected together by a screw or rivet pivot P. Located between the shanks is a wire spring S, which has the general form of the letter U. At the bend of the wire the spring is given one or more turns and formed with a coil G, and the arms E and F of the spring extend forward on either side of the shears to and preferably beyond the pivot, where they are connected to the blades by inturned ends H I, fitting into recesses J, formed in the blades to receive them.

As above explained, the spring and its connection with the blades are entirely independent of the pivot, which need not therefore be an adjusting-pivot, and the point of connection while preferably in advance or pointward of the pivot need not necessarily be so located.

As shown in Fig. 1, the points of connection of the front ends of the spring are above and below the pivot. The object of this arrangement is to apply the tension of the spring as near as practicable to the cutting edge of the blades.

The construction being as thus described, the operation of the spring will be readily understood without further explanation. It may be noted, however, that the normal tendency of the arms of the spring to close together is not disturbed by opening or closing the blades, for the reason that the coil in the bend of the spring allows sufficient freedom of movement without cramping the spring or impairing its function of keeping the blades together. It is also to be noted that when the points of connection between the spring-arms and the blades are above and below the pivot there would be some tendency to close the jaws, especially when connected considerably in front of the pivot. It is not the intention, however, that the spring should exercise any particular force in closing or opening the blades, and for this reason it is admissible to connect them as near the pivot as practicable, so as to produce the best effect in keeping the cutting edge of the blades together throughout the movements of the blades themselves.

Having thus described my invention, what I claim is—

1. A pair of scissors or shears, combined with a U-shaped spring having its arms lying on either side of the shears and connected thereto independently of the pivot.

2. A pair of scissors or shears, combined with a U-shaped spring having its arms lying on either side of the shears and connected thereto eccentrically to the pivot.

3. A pair of scissors or shears, combined with a U-shaped spring having its arms lying on either side of the shears and connected thereto eccentrically to the pivot, said spring being formed with a coil at the bend.

4. A pair of scissors or shears, combined with a U-shaped spring having its arms extended forward on either side and connected to the blades in front of the pivot.

5. A pair of scissors or shears, combined with a U-shaped spring having its arms extended forward on either side and connected to the blades in front of the pivot, said arms being connected to the blades at points above and below the pivot, respectively.

6. A pair of scissors or shears, combined with a U-shaped spring having its arms lying on either side of the shears and connected thereto eccentrically to the pivot, said spring being formed with a coil at the bend, and with inturned ends at the extremities of its arms to engage depressions in the blades.

In testimony whereof I affix my signature in the presence of two witnesses.

HARVEY L. HOPKINS.

Witnesses:
JOHN H. MCELROY
R. K. GUSTAFSON.